United States Patent [19]

Rees

[11] 3,938,675
[45] Feb. 17, 1976

[54] PAIRING AND STACKING SYSTEM FOR MOLDED ARTICLES

[75] Inventor: Herbert Rees, Willowdale, Canada

[73] Assignee: Husky Injection Molding Systems Limited, Bolton, Canada

[22] Filed: Feb. 24, 1975

[21] Appl. No.: 552,180

[52] U.S. Cl. .................... 214/6 M; 53/308; 198/32; 214/6 BA
[51] Int. Cl.$^2$ ........................................ B65G 57/30
[58] Field of Search ................. 214/6 M, 6 BA, 6.5; 53/306, 308, 310, 312; 198/32

[56] References Cited
UNITED STATES PATENTS

| | | | |
|---|---|---|---|
| 2,464,627 | 3/1949 | Weiss | 214/6 M X |
| 2,509,467 | 5/1950 | Anderson, Jr. | 214/6 M X |
| 2,748,417 | 6/1956 | Heim | 214/6 M X |
| 2,925,797 | 2/1960 | Diezel et al. | 53/308 X |
| 3,396,857 | 8/1968 | Brown | 214/6 BA |
| 3,714,755 | 2/1973 | Phalin et al. | 53/308 X |

Primary Examiner—Robert J. Spar
Assistant Examiner—Leslie J. Paperner
Attorney, Agent, or Firm—Karl F. Ross; Herbert Dubno

[57] ABSTRACT

A conveyor mechanism including two belts carries two types of interfitting molded articles such as cups and lids from a molding machine to an assembly station, maintaining a constant orientation between them. The assembly station comprises a pair of synchronized and overlapping star wheels, counterrotated by a Geneva drive, which remove the molded articles from the conveyor belts, bring them into vertical alignment, and come to a momentary stop in this position in which a plunger synchronized with the Geneva motion of the star wheels joins the two parts together and pushes them into an overlying stacker tube, whereupon the star wheels resume their motion. Several stacker tubes, linked by an endless transport chain, are capable of receiving a limited number of pairs of molded articles, their drive mechanism being so coupled with the star-wheel drive as to advance the chain to bring a loaded stacker tube to an unloading station whenever a preceding tube in the array has been filled.

10 Claims, 7 Drawing Figures

PAIRING AND STACKING SYSTEM FOR MOLDED ARTICLES

CROSS-REFERENCE TO RELATED APPLICATION

This application relates to subject matter disclosed in my copending application Ser. No. 455,318 filed Mar. 27, 1974.

FIELD OF THE INVENTION

My present invention relates to a system for pairing and stacking interfitting molded articles as they come off an injection-molding machine.

BACKGROUND OF THE INVENTION

In my above-identified copending application I have disclosed a system for the guidance of molded articles successively discharged from an injection-molding machine, the system including one or more pairs of rails forming tracks for the controlled descent of the articles from their mold cavities. In this way, the articles maintain the orientation with which they are ejected from the cavities wherein they are formed.

In many instances it is convenient to mold simultaneously two sets of different but mutually complementary articles, e.g. hollowware such as Petri dishes or cups and mating lids to be fitted together to form a closed container. With the system of my prior application, these complementary articles can be received from the machine in the proper relative position for assembly. Up to now, however, the intervention of a human operator has still been necessary at this stage for pairing the complementary parts, assembling them into the final products and stacking these products.

OBJECTS OF THE INVENTION

The general object of my present invention, therefore, is to provide a system associated with an injection-molding machine for automatically performing the steps last referred to.

A more particular object is to provide means in such a system for performing the steps of pairing, assembling and stacking at a rate synchronized with the operating cycles of the associated molding machine so that the final products (e.g. containers) can be taken off as fast as their components are produced by the machine.

SUMMARY OF THE INVENTION

A system according to my present invention comprises a pair of rotatable supporting members, each having one or more cutouts for respectively receiving a molded article of a first and a second article, referred to hereinafter as a cup and a lid, these cutouts describing overlapping closed paths which define a position of mutual alignment for the complementary articles received therein. The two supporting members are intermittently actuated, e.g. by a Geneva drive, so as to be substantially at standstill in the position of alignment. A pusher synchronized with the intermittently effective drive means jointly dislodges a pair of complementary articles from the aligned cutouts in juxtaposed relationship, discharging them into receiving means such as a downwardly open tube above the overlapping paths of the supporting members.

In a preferred embodiment of my invention, the supporting members are star wheels with curved teeth forming the aforementioned cutouts between them. Freshly molded articles are deposited on respective conveyors forming part of a feed mechanism synchronized with the molding machine, the conveyors carrying these articles to the respective star wheels at locations spaced by a whole number of tooth divisions from the alignment position so that the wheels are loaded during standstill while the articles previously delivered to them are removed into the stacker tube.

With the star wheels rotatable about substantially vertical axes, the pusher advantageously comprises a vertically reciprocable plunger disposed overlapping wheel segments in line with the stacker tube located above these segments, this plunger coacting with retaining means in the form of a pair of swingable arms synchronized with the wheel drive and periodically juxtaposable with the top of the plunger in an elevated position thereof for temporarily supporting a pair of aligned complementary articles at the bottom of the stacker tube as the plunger is withdrawn below the wheel level.

For expeditious delivery of the assembled articles to a further destination, several stacker tubes may be combined into a parallel array provided with intermittently operable transport means forming a closed loop for the sequential movement of these tubes past an unloading station. The means should be synchronized with the star-wheel drive to advance the array of stacker tubes after a predetermined number of plunger strokes corresponding to the number of assembled products which can be accommodated by each tube. Advantageously, the star-wheel drive is decelerated during operation of the transport means so as to allow sufficient time for the alignment of a new tube with the plunger before the latter moves upward to dislodge the next pair of complementary articles from the corresponding inter-tooth spaces of the wheels.

BRIEF DESCRIPTION OF THE DRAWING

The above and other features of my invention will now be described in detail with reference to the accompanying drawing in which.

SPECIFIC DESCRIPTION

Figure 1:
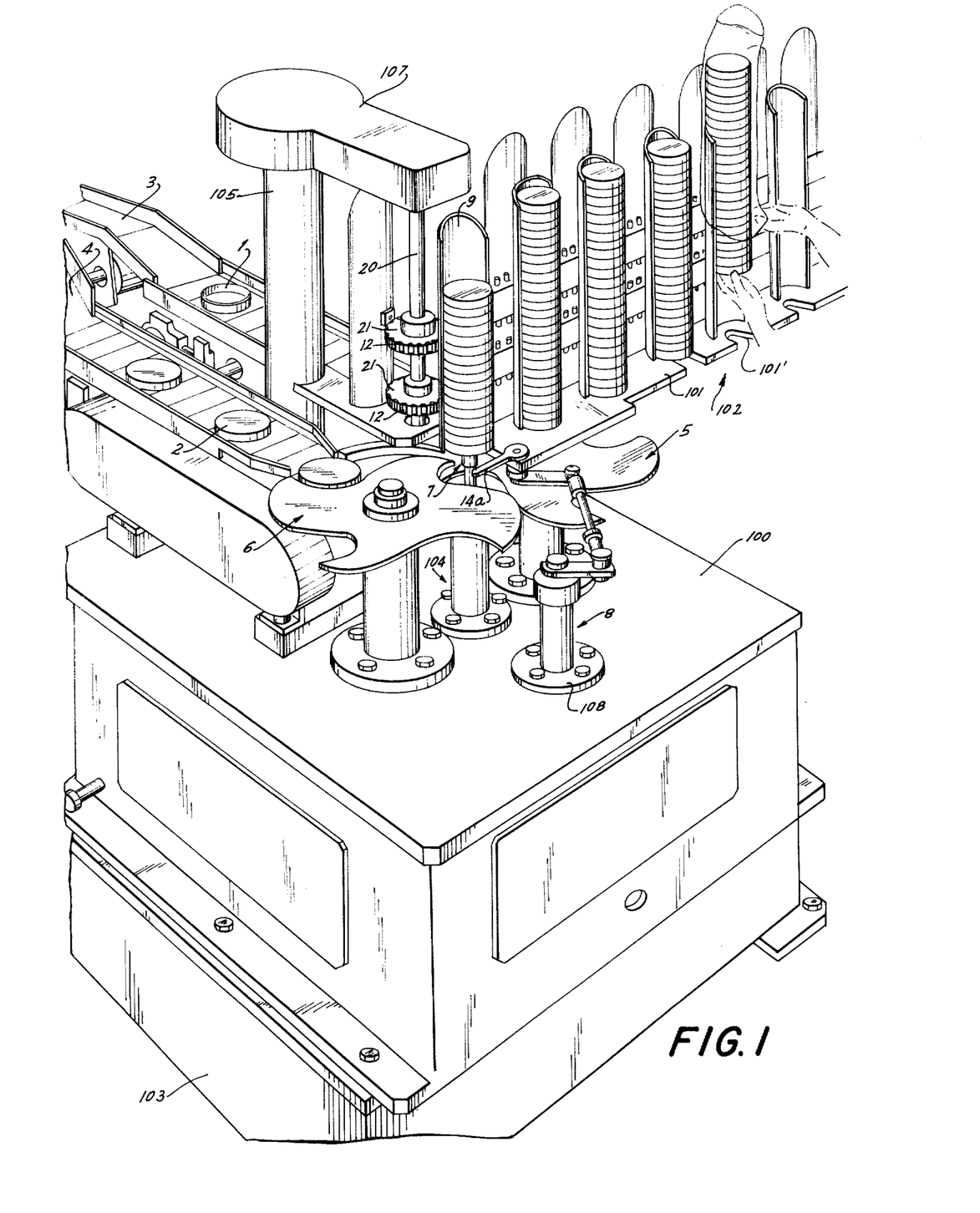
FIG. 1 is an overall perspective view of a system according to my invention, associated with a nonillustrated injection-molding machine.

Reference will first be made to FIG. 1 showing the principal parts of a pairing and stacking system according to my invention, the system being associated with a nonillustrated injection-molding machine from which at least one pair of complementary parts, namely a cup 1 and a lid 2, are discharged during each molding cycle. The articles 1 and 2 are deposited, directly or indirectly, on respective horizontal conveyor belts 3 and 4 by a pair of guide rails, not shown, of the type described in my prior application Ser. No. 455,318. The belts 3 and 4 lead generally radially toward a pair of horizontal star wheels 5 and 6 above a base plate 100, forming part of a machine frame 103, which overlies a driving unit (more fully described hereinafter) imparting intermittent rotation to the wheels 5 and 6. Belts 3 and 4 are flanked by guide strips 3' and 4' whose converging extremities are elastic tongues which yield outwardly upon the passage of a molded article therebetween.

Figure 5:
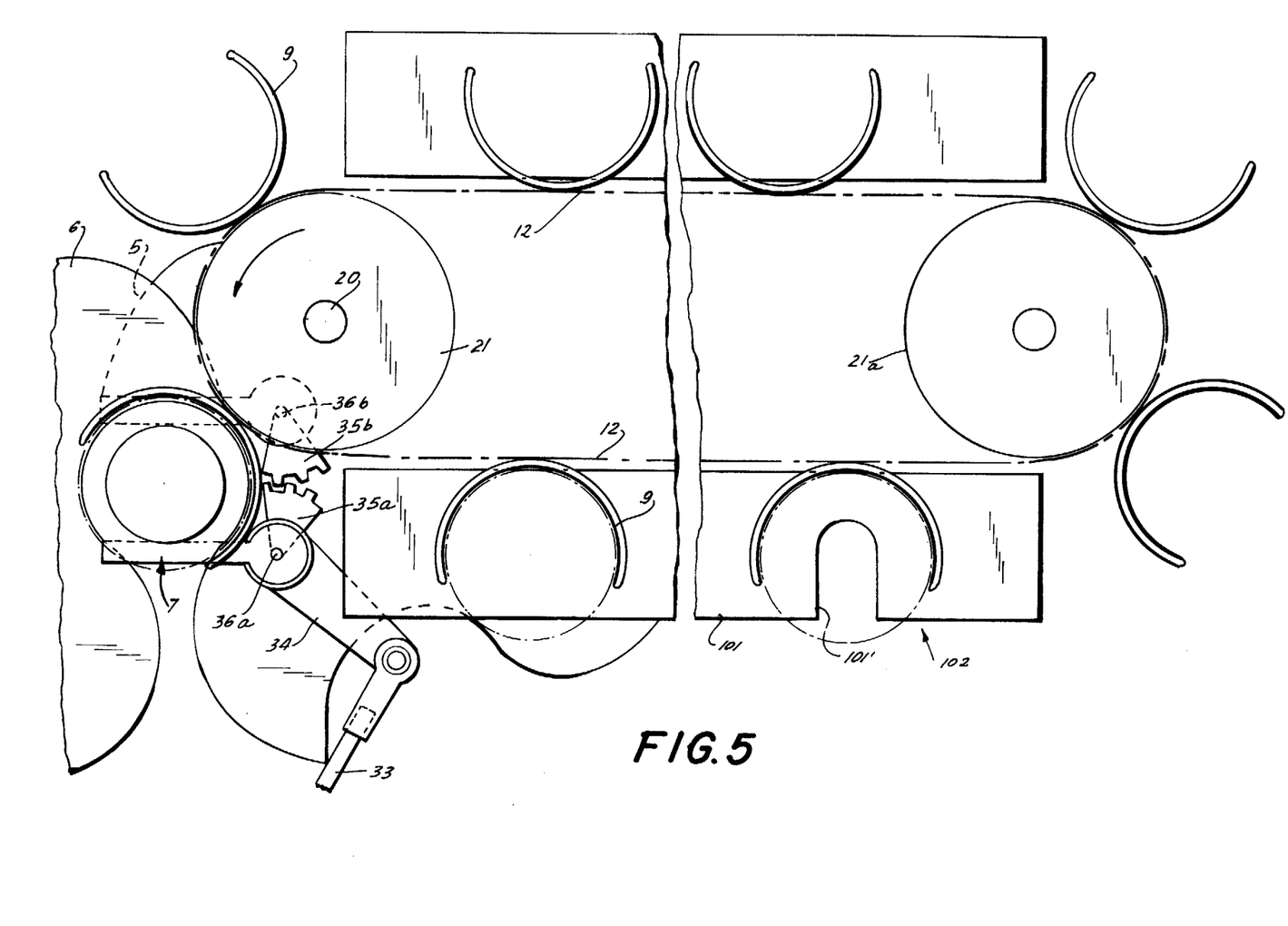
FIG. 5 is a top view of an array of stacker tubes forming part of the system of FIG. 1.

Star wheels 5 and 6, overlappingly disposed at different horizontal levels, are of mutually symmetrical configuration and are each provided with four teeth spaced 90° apart, the teeth being separated by cutouts 5', 6' (FIG. 2) shaped to accommodate the cups 1 and the lids 2, respectively. The circular centerlines of these cutouts, indicated at 5'' and 6'', contact each other above a vertical plunger 15 forming part of a loading station 7. At that point, therefore, the mating articles 1 and 2 respectively held in cutouts 5' and 6', to which they are delivered by the conveyors 3 and 4, are coaxially superposed and are also aligned with the plunger 15 as well as with a downwardly open stacker tube 9 disposed above the level of the upper star wheel 6; a number of such stacker tubes, forming incomplete vertical cylinders giving access to their interior, are attached at equispaced locations to a pair of vertically spaced endless chains 12 as best seen in FIG. 5. Each chain passes around two sprockets 21 and 21a, sprockets 21 being intermittently driven by the mechanism described hereinafter. A shelf 101 underlies the array of stacker tubes 9, alongside one run of their transport chains 12, to form a support for their contents between the region of plunger 15 and an unloading station 102 where the tubes are manually or automatically emptied before returning to the loading point 7 above plunger 15. Cups 1 and lids 2 are temporarily supported in cutouts 5' and 6' by stationary shelves 111 and 112, the former underlying the upper wheel 5 and terminating just short of the lower wheel 6 which in turn overlies the shelf 112 provided with an aperture for plunger 15.

Figure 2:
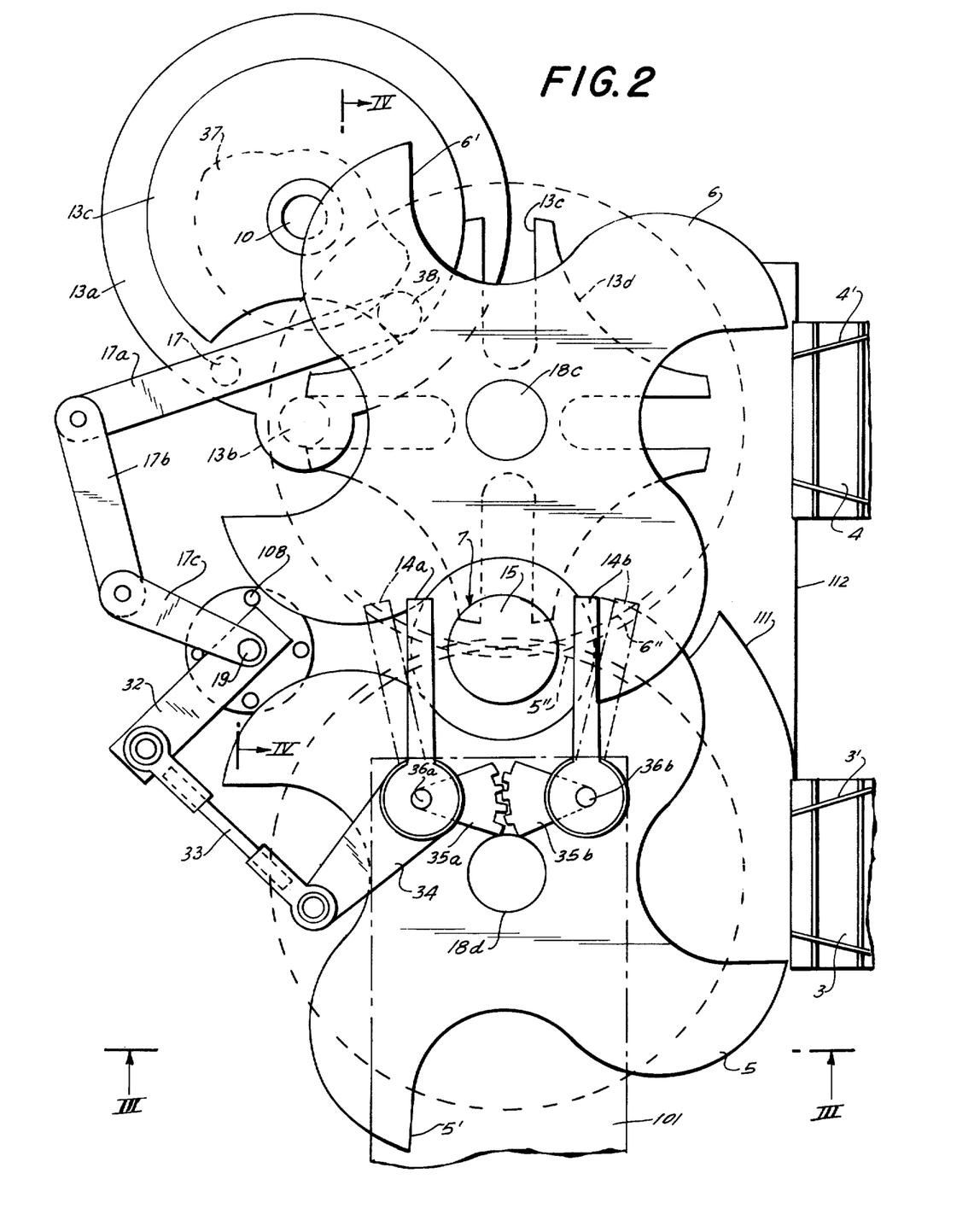
FIG. 2 is a plan view of part of the system of FIG. 1, drawn to a larger scale, illustrating a pair of coacting star wheels.

The star wheels 5 and 6 counterrotate intermittently, in synchronized relationship with the operation of conveyor belts 3 and 4 so as to perform a quarter turn after receiving freshly molded articles 1 and 2 from these belts. With wheel 5 turning counterclockwise and wheel 6 turning clockwise as seen in FIG. 2, this quarter-turn rotation aligns the two articles with each other and with the plunger 15 which thereupon ascends to lift them into the overlying stacker tube 9, the articles being simultaneously interfitted to form a closed container. Before the plunger withdraws, two retaining arms 14a and 14b forming part of an escape mechanism 8 swing in opposite directions toward the plunger below the level of tube 9 so as to come to lie underneath the container just pushed into that tube. The retaining arms stay in this position as the plunger descends preparatorily to another 90° rotation of the star wheels which aligns a new pair of mating articles with the plunger and the stacker tube. The arms 14a, 14b are then spread apart to let the plunger lift this new pair into the tube, the process being repeated until the tube is filled to capacity; in the present instance it is assumed that each tube will hold 20 pairs. At that stage, while the plunger withdraws, transport chains 12 are driven to move the loaded tube 9 onto the shelf 101 and to let the next, empty tube take its place at the loading point 7 above plunger 15.

Figure 6:
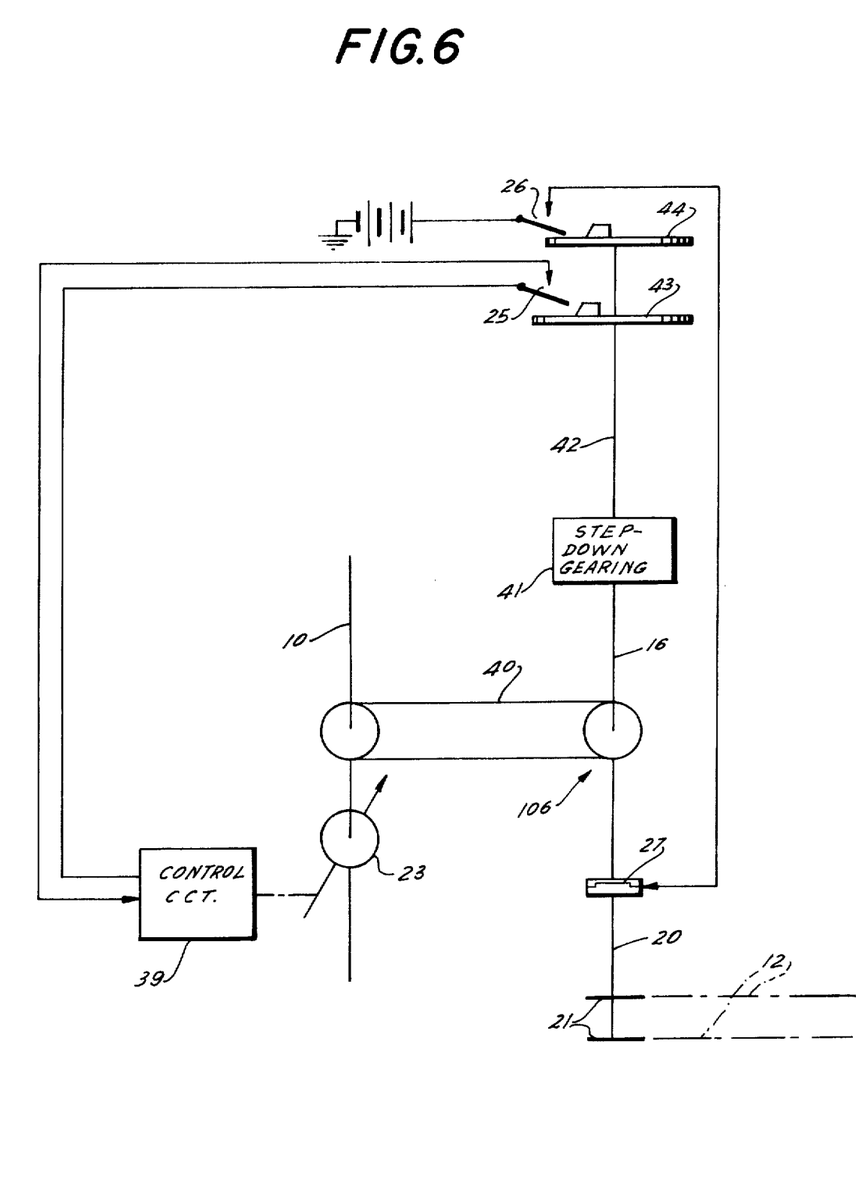
FIG. 6 is a schematic view of a control mechanism for the system.

The driving unit accommodated below base 100 on the machine frame 103 comprises a vertical main shaft 10 (FIG. 2) which is continuously driven by a motor 23 schematically indicated in FIG. 6. Shaft 10 rises above base 100 within a stationary tube 105 to drive an ancillary vertical shaft 20, carrying the sprockets 21, through a transmission 106 (FIG. 6) disposed in a casing 107 visible in FIG. 1. Shaft 10 has keyed to it a disk 13a, forming part of a Geneva drive 13 (FIG. 2), which has an eccentric pin 13b engageable in radial slots 13c of a coacting disk 13d as is well known per se. Shaft 10 also carries a disk 13e having a segmental cutout which extends over an arc of 90°, the periphery of disk 13e coming to rest against complementary edges of disk 13d during three quarters of a turn of shaft 10 so as to arrest the disk 13d whenever the pin 13b is withdrawn from the slots 13c. Disk 13d is keyed to a vertical shaft 18c which thus performs a quarter of a turn during each revolution of drive shaft 10. Shaft 18c carries the star wheel 6 as well as a gear 18a which mates with a gear 18b on a parallel shaft 18d, the latter carrying the star wheel 5. Thus, the two star wheels 5 and 6 counterrotate intermittently under the control of Geneva drive 13.

Figure 3:
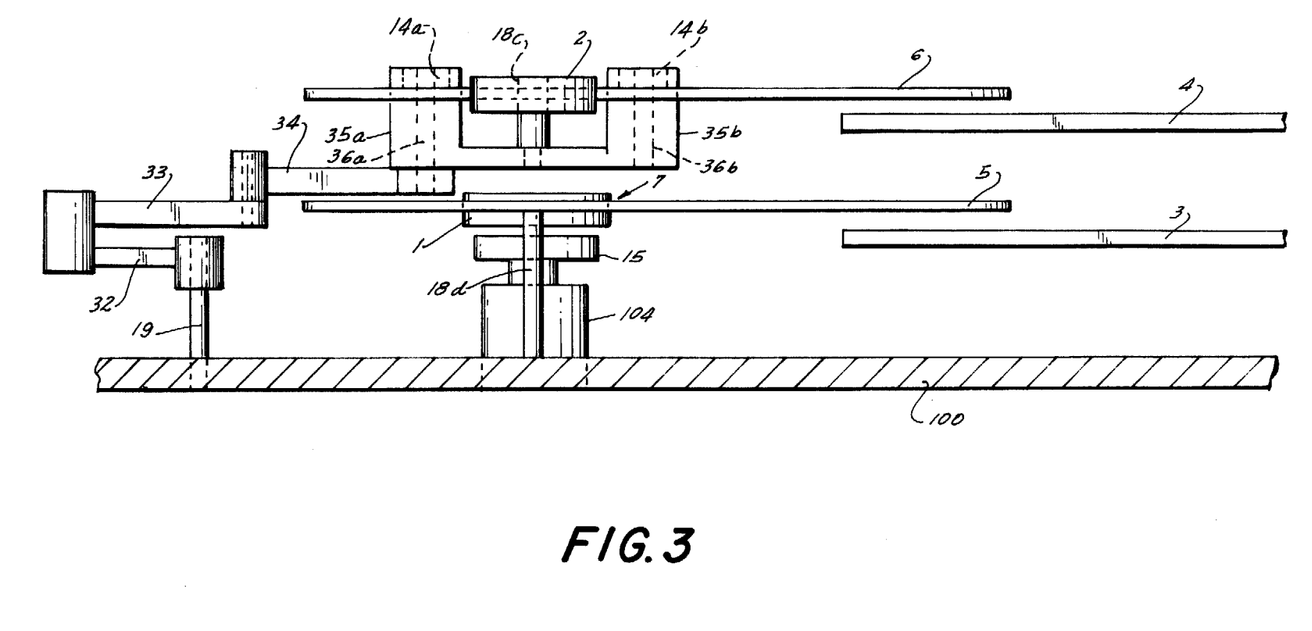
FIGS. 3 and 4 are fragmentary sectional elevations respectively taken on the lines III — III and IV — IV of FIG. 2.

Also mounted on shaft 10 is a cam 37 coacting with a cam follower 38 on a lever 17a which is fulcrumed at 17 to the base 100 and, via an articulated linkage 17b, 17c, turns a shaft 19 carrying an arm (see also FIG. 3). Shaft 19, which is journaled in a bearing 108 also illustrated in FIG. 1, is rigid with another arm, the latter being connected through an adjustable link 33 with a lever 34 on a pin 36a which is journaled in the stack-supporting shelf 101. Lever 34 is rigid with retaining arm 14a as well as with a sector gear 35a meshing with a similar sector gear 35b on a pin 36b also journaled in shelf 101, sector 35b being rigid with the other arm 14b of escape mechanism 8.

Figure 4:
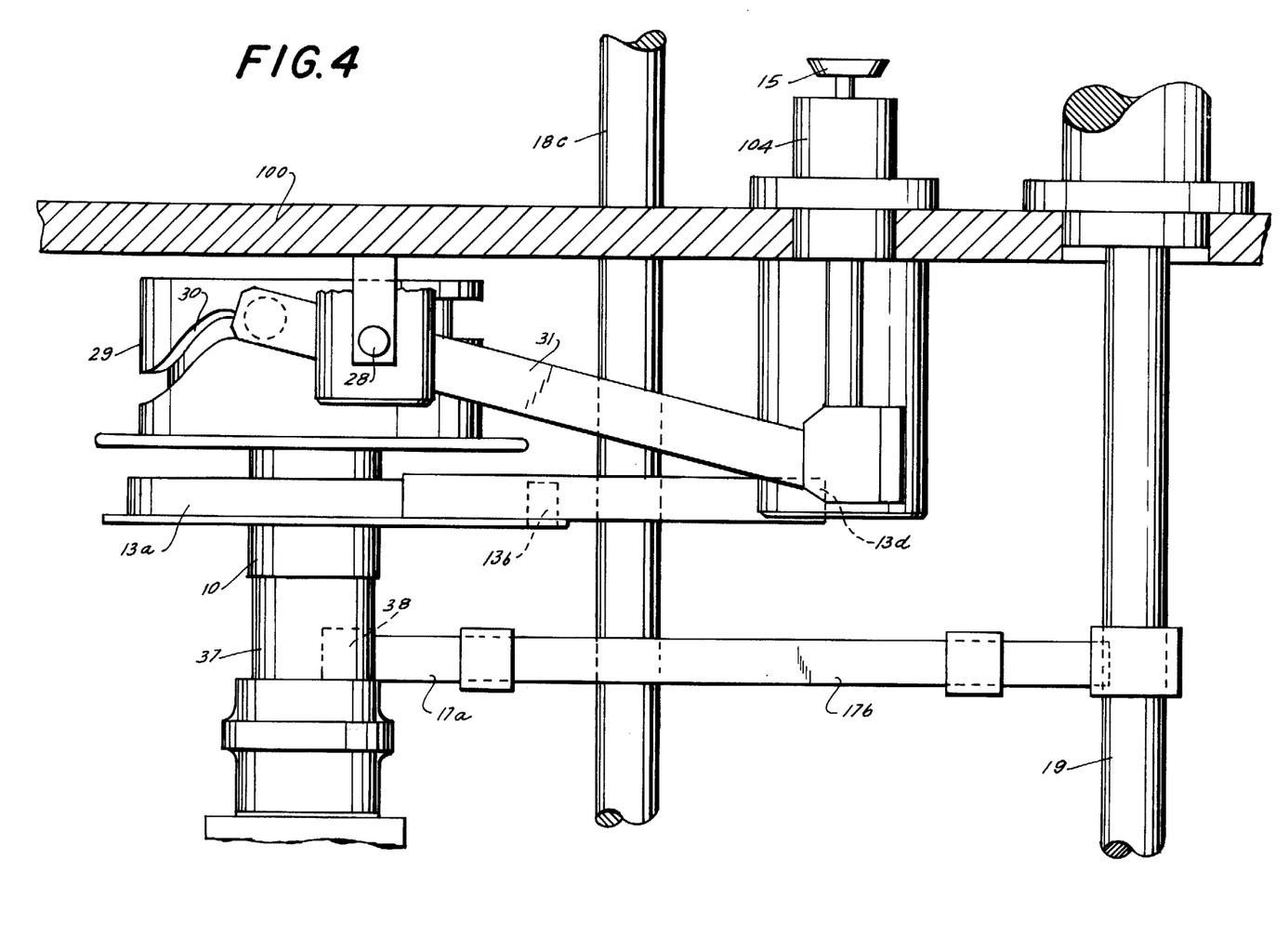

As illustrated in FIG. 4, main shaft 10 carries a cam 29 with a peripheral groove 30 accommodating a cam follower 31' on a lever 31 which is fulcrumed at 28 to the base 100 and whose opposite end engages the lower extremity of plunger 15, the latter being guided in a sleeve 104. Thus, the swing of arms 14a, 14b and the vertical reciprocation of plunger 15 are positively synchronized with the Geneva drive 13 through the intermediary of the continuously rotating shaft 10.

The transmission 106 operatively linking the main shaft 10 with the sprocket shaft 20 includes an ancillary shaft 16 driven by a belt 40 from shaft 10, shaft 16 being connected through a step-down gearing 41 to another shaft 42 carrying a pair of cams 43 and 44. These cams are provided with relatively offset humps controlling two switches 25 and 26; switch 25, which closes slightly before switch 26, inserts a nonillustrated resistance in a control circuit 39 of motor 23 to slow down its rotation whereupon switch 26 cuts in a clutch 27 which couples the ancillary shaft 16 with sprocket shaft 20. The step-down ratio of gearing 41 is 1:20 so that switches 25 and 26 close once every twenty revolutions of main shaft 10.

Figure 7:
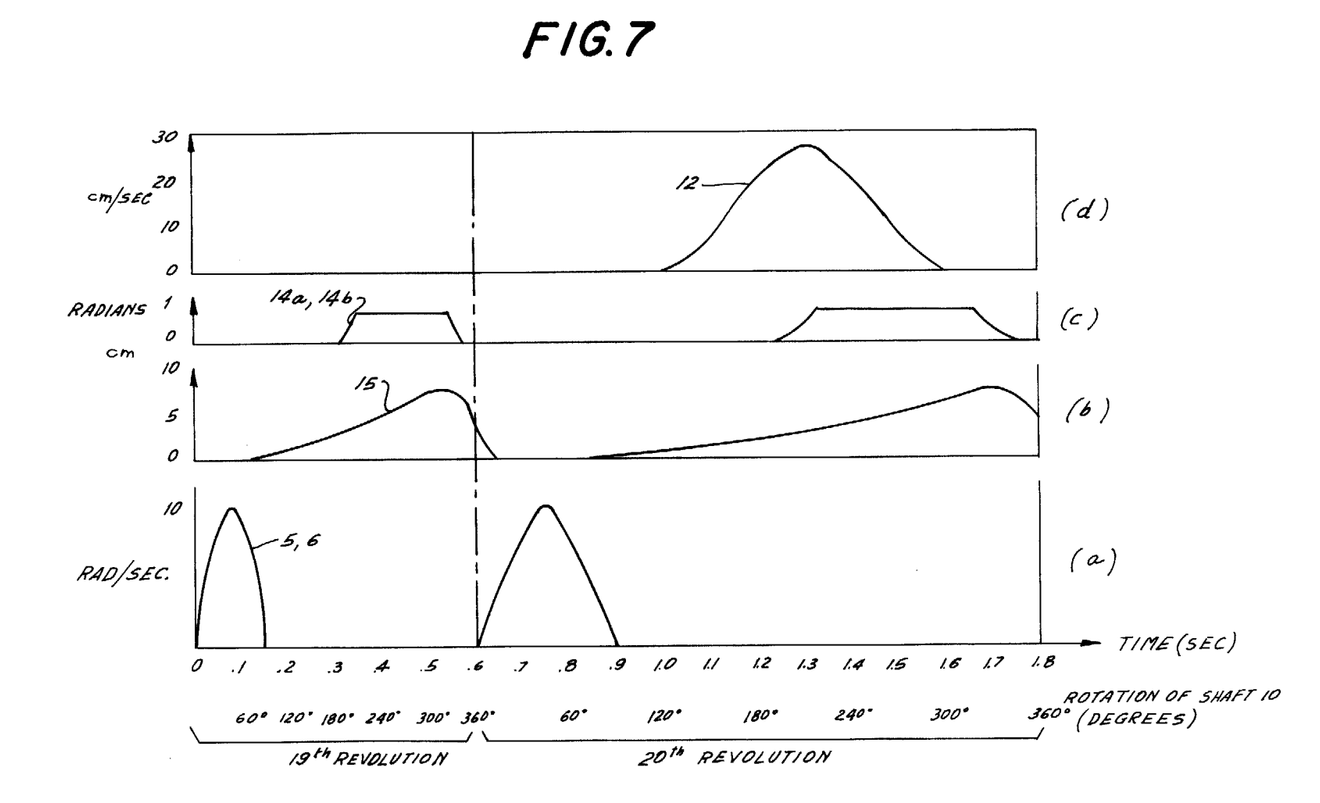
FIG. 7 is a set of graphs showing the relative timing of the opeations of various components of the system.

Reference will now be made to FIG. 7 which shows the relative timing of the operations of the various units described above.

In FIG. 7 I have indicated along the abscissa successive increments of rotation (in degrees) of main shaft 10 during the 19th and 20th cycles, or revolutions of that shaft. From the relative magnitudes of these two sets of values it will be apparent that the shaft rotation, which is practically constant during the first 19 cycles of a 20-cycle period, drops to about half its normal magnitude in the 20th cycle.

Graph (a) of FIG. 7 shows the rotary speed of star wheels 5 and 6, in radians per second, during these two shaft revolutions. As will be readily apparent, wheels 5 and 6 turn during the first quarter of each cycle and are otherwise stationary.

Graph (b) illustrates, in centimeters, the vertical reciprocation of plunger 15 which, it will be noted, begins its rise approximately with the cessation of motion of the star wheels and returns to its retracted position about the time when these wheels resume their rotation.

Graph (c) shows the swing, in radians, of retaining arms 14a and 14b away from each other to give passage to a new pair of articles 1, 2 lifted by the rising plunger, the zero line representing their position of closest approach in which they support a stack of articles in the overlying tube 9. Thus, the arms begin to open on the rising stroke of the plunger and close again before the latter starts its descent.

Graph (d) shows that, during the 20th cycle only, the transport chains 12 are set in motion to displace the array of stacker tubes 9 by a distance representing the center-to-center spacing of two adjoining tubes 9; the velocity of the transport chains is plotted in cm/sec. The slowdown of all other motions in that cycle gives the system sufficient time to accelerate and decelerate the chains to the necessary extent without the creation of excessive stresses. It should be noted that the chains come to rest before the plunger 15 has reached its top position so that an empty tube 9 is properly aligned with the plunger at the end of its loading stroke.

The removal of a stack of twenty superposed containers 1, 2 from a fully loaded tube, at unloading station 102, may be carried out manually by slipping an inverted plastic bag from above over the tube to be unloaded, the shelf 101 being provided with a marginal slot 101′ allowing an operator's finger to be moved from below into the tube for the purpose of pushing the stack into the bag whereupon the filled bag is removed. Alternatively, the stacked containers could be allowed to drop through a hole in shelf 101 into a receptacle temporarily positioned beneath that hole as soon as a loaded tube aligns itself therewith.

If two or more unloading stations associated with different molding machines are to be served by one operator, the provision of several finger slots 101′ on shelf 101 in spaced-apart positions enables that operator to empty a corresponding number of tubes 9 in rapid succession at one station and then do the same thing at another station while the automatic filling of the tubes continues.

The numerical values appearing in the graphs of FIG. 7 are, of course, given merely by way of example and are not critical for the realization of a pairing and stacking system embodying the principles of my invention.

I claim:

1. A system for pairing and stacking molded articles of a first and a second type simultaneously coming from a molding machine, comprising:
    a pair of rotatable supporting members each having at least one cutout for receiving a molded article of said first and said second type, respectively, said cutouts describing overlapping closed paths and being mutually aligned in a predetermined position of said members;
    feed means for respectively supplying said articles of first and second type to said members and depositing an article in each cutout ahead of the region of overlap;
    drive means for said members intermittently actuating same with substantial standstill in said predetermined position;
    pusher means synchronized with said drive means for jointly dislodging a pair of articles from said cutouts in juxtaposed relationship during standstill of said members; and
    receiving means for said pair of articles on the side of said members opposite said pusher means.

2. A system as defined in claim 1 wherein said members are wheels rotatable about substantially vertical axes.

3. A system as defined in claim 2 wherein said wheels have curved teeth forming said cutouts.

4. A system as defined in claim 2 wherein said pusher means comprising a vertically reciprocable plunger disposed below overlapping segments of said wheels, said receiving means including a downwardly open stacker tube above said overlapping segments aligned with said plunger.

5. A system as defined in claim 4, further comprising retaining means synchronized with said drive means juxtaposable with the top of said plunger in an elevated position thereof for temporarily supporting a pair of said articles at the bottom of said stacker tube.

6. A system as defined in claim 5 wherein said retaining means comprises a pair of arms hugging said plunger in said elevated position thereof.

7. A system as defined in claim 4 wherein said stacker tube is part of an array of substantially identical parallel tubes provided with intermittently operable transport means for sequentially moving same past an unloading station.

8. A system as defined in claim 7 wherein said transport means forms a closed loop for the movement of said tubes past said unloading station.

9. A system as defined in claim 7, further comprising actuating means coupled with said drive means for operating said transport means upon execution of a predetermined number of strokes by said plunger.

10. A system as defined in claim 9 wherein said transport means includes control means for said drive means reducing the speed of rotation of said wheels during operation of said transport means.

* * * * *